(12) United States Patent
Kawasaki et al.

(10) Patent No.: US 9,765,413 B2
(45) Date of Patent: Sep. 19, 2017

(54) HIGH-STRENGTH GALVANIZED STEEL SHEET WITH HIGH YIELD RATIO HAVING EXCELLENT DUCTILITY AND STRETCH FLANGE FORMABILITY AND METHOD FOR MANUFACTURING THE SAME

(75) Inventors: Yoshiyasu Kawasaki, Chiba (JP); Tatsuya Nakagaito, Chiba (JP); Shinjiro Kaneko, Fukuyama (JP); Yasunobu Nagataki, Fukuyama (JP); Keisuke Fukushi, Tokyo (JP)

(73) Assignee: JFE Steel Corporation (JP)

( * ) Notice: Subject to any disclaimer, the term of this patent is extended or adjusted under 35 U.S.C. 154(b) by 1073 days.

(21) Appl. No.: 13/809,953

(22) PCT Filed: Jul. 12, 2011

(86) PCT No.: PCT/JP2011/066290
§ 371 (c)(1),
(2), (4) Date: Jun. 25, 2013

(87) PCT Pub. No.: WO2012/008597
PCT Pub. Date: Jan. 19, 2012

(65) Prior Publication Data
US 2013/0266821 A1    Oct. 10, 2013

(30) Foreign Application Priority Data

Jul. 15, 2010 (JP) .................................. 2010-160401
Jun. 29, 2011 (JP) .................................. 2011-144093

(51) Int. Cl.
| | |
|---|---|
| *C21D 6/00* | (2006.01) |
| *B05D 3/12* | (2006.01) |
| *B05D 3/02* | (2006.01) |
| *C21D 9/46* | (2006.01) |
| *C22C 38/00* | (2006.01) |
| *C22C 38/06* | (2006.01) |
| *C23C 2/40* | (2006.01) |
| *C22C 1/02* | (2006.01) |

(52) U.S. Cl.
CPC ........... *C21D 6/005* (2013.01); *B05D 3/0218* (2013.01); *B05D 3/12* (2013.01); *C21D 6/008* (2013.01); *C21D 9/46* (2013.01); *C22C 1/02* (2013.01); *C22C 38/00* (2013.01); *C22C 38/06* (2013.01); *C23C 2/40* (2013.01); *C21D 2211/005* (2013.01); *C21D 2211/008* (2013.01); *Y10T 428/12965* (2015.01)

(58) Field of Classification Search
CPC .. B05D 3/0218; B05D 3/12; C21D 2211/005; C21D 2211/008; C21D 6/005; C21D 6/008; C21D 9/46; C22C 1/02; C22C 38/00; C22C 38/06; C23C 2/40; Y10T 428/12965
See application file for complete search history.

(56) References Cited

U.S. PATENT DOCUMENTS

| | | | |
|---|---|---|---|
| 2003/0106622 A1* | 6/2003 | Matsuoka | ........... C21D 8/0226 148/603 |
| 2003/0129444 A1 | 7/2003 | Matsuoka et al. | |
| 2008/0131305 A1 | 6/2008 | Okitsu | |
| 2010/0112377 A1 | 5/2010 | Kaneko et al. | |
| 2010/0218857 A1* | 9/2010 | Nakagaito | ................ C21D 8/04 148/533 |

FOREIGN PATENT DOCUMENTS

| | | |
|---|---|---|
| EP | 2 157 203 | 2/2010 |
| JP | 2001-192767 | 7/2001 |
| JP | 2001-335892 A | 12/2001 |
| JP | 2002-161317 A | 6/2002 |
| JP | 2007-321180 A | 12/2007 |
| JP | 2008-214752 | 9/2008 |
| JP | 2008-274416 A | 11/2008 |
| JP | 2008-291314 A | 12/2008 |
| JP | WO 2009054539 A1 * | 4/2009 ............... C21D 8/04 |
| JP | 2009-102714 A | 5/2009 |

OTHER PUBLICATIONS

R.O. Rocha, T.M.F. Melo, E.V. Pereloma, D.B. Santos Microstructural evolution at the initial stages of continuous annealing of cold rolled dual-phase steel Materials Sciences and Engineering A 391 (2005) 296-304.*
Supplementary European Search Report dated Jul. 25, 2017, of corresponding European Application No. 11806927.7.

* cited by examiner

*Primary Examiner* — Jessee Roe
*Assistant Examiner* — Jenny Wu
(74) *Attorney, Agent, or Firm* — DLA Piper LLP (US)

(57) ABSTRACT

A high-strength galvanized steel sheet with high yield ratio having excellent ductility and stretch flange formability, the steel sheet having a chemical composition containing, by mass %, C: 0.04% or more and 0.13% or less, Si: 0.9% or more and 2.3% or less, Mn: 0.8% or more and 2.4% or less, P: 0.1% or less, S: 0.01% or less, Al: 0.01% or more and 0.1% or less, N: 0.008% or less, and the balance being Fe and inevitable impurities and a microstructure including, in terms of area ratio, 94% or more of a ferrite phase and 2% or less of a martensite ferrite phase, wherein mean grain size of ferrite is 10 μm or less, Vickers hardness of ferrite is 140 or more, mean grain size of carbide particles existing at grain boundaries of ferrite is 0.5 μm or less, and aspect ratio of carbide particles existing at the grain boundaries of ferrite is 2.0 or less.

18 Claims, No Drawings

HIGH-STRENGTH GALVANIZED STEEL SHEET WITH HIGH YIELD RATIO HAVING EXCELLENT DUCTILITY AND STRETCH FLANGE FORMABILITY AND METHOD FOR MANUFACTURING THE SAME

RELATED APPLICATIONS

This is a §371 of International Application No. PCT/JP2011/066290, with an international filing date of Jul. 12, 2011 (WO 2012/008597 A1, published Jan. 19, 2012), which is based on Japanese Patent Application Nos. 2010-160401, filed Jul. 15, 2010, and 2011-144093, filed Jun. 29, 2011, the subject matter of which is incorporated herein by reference.

TECHNICAL FIELD

This disclosure relates to a high-strength galvanized steel sheet with high yield ratio having excellent ductility and stretch flange formability which can be ideally used as a material for parts in the automotive industry and to a method for manufacturing the steel sheet.

BACKGROUND

Recently, there has been a strong demand to improve fuel efficiency to reduce $CO_2$ emission of automobiles due to growing awareness of global environment conservation. This has led to a trend of reducing the necessary thickness of materials for automobile bodies by strengthening the materials to reduce the weight of automobiles. However, there is a concern that strengthening of a steel sheet is accompanied by a decrease in ductility and stretch flange formability. Therefore, there has been a demand for the development of a high-strength steel sheet having high ductility and high stretch flange formability. Moreover, from the viewpoint of the achievement of buckling resistance for realizing occupant protection in a side collision, the demand for a steel sheet with high yield ratio has also been growing. In addition, the need for a high-strength galvanized steel sheet has been growing as a material for parts in consideration of corrosion resistance.

To improve stretch flange formability, for example, Japanese Unexamined Patent Application Publication No. 2008-291314 discloses a high-strength galvannealed steel sheet having stable in material quality and excellent stretch flange formability which has the specified chemical composition and a multi-phase microstructure in which the area ratio and the grain size of a ferrite phase, the size and the amount of fine precipitates in a ferrite phase, and the area ratio of a retained austenite phase are specified, and a method for manufacturing the steel sheet. Moreover, to increase the stretch flange formability and the yield ratio of a high-strength steel sheet, Japanese Unexamined Patent Application Publication No. 2001-335892 discloses a high-strength hot-rolled steel sheet and a high-strength galvanized steel sheet having excellent formability which has the specified chemical composition and a multi-phase microstructure in which the hard phase microstructures of a martensite phase, a retained austenite phase and a bainite phase are finely dispersed in a ferrite matrix and a method for manufacturing the steel sheets. Furthermore, Japanese Unexamined Patent Application Publication No. 2008-274416 discloses a hot-rolled steel sheet having excellent fatigue property and stretch flange formability which has the specified chemical composition and a ferrite-based microstructure in which the ratio between Ti content and C content is controlled and a method for manufacturing the steel sheet.

However, as a main object of JP '314 is to improve stretch flange formability, an increase in ductility and yield ratio is not considered. Moreover, although an increase in ductility and yield ratio is considered in JP '892 and JP '416, the improvement in ductility is not investigated. Therefore, the development of a high-strength galvanized steel sheet having all of high ductility, high stretch flange formability and high yield ratio remains a problem.

In view of the situation described above, it could be helpful to provide a galvanized steel sheet with high yield ratio having not only high strength (tensile strength TS of 590 MPa or more), but also excellent ductility and stretch flange formability and a method for manufacturing the steel sheet.

SUMMARY

We provide:

[1] A high-strength galvanized steel sheet with high yield ratio having excellent ductility and stretch flange formability, the steel sheet having a chemical composition containing, by mass %, C, 0.04% or more and 0.13% or less, Si: 0.9% or more and 2.3% or less, Mn: 0.8% or more and 2.4% or less, P: 0.1% or less, S: 0.01% or less, Al: 0.01% or more and 0.1% or less, N, 0.008% or less, and the balance being Fe and inevitable impurities and a microstructure including, in terms of area ratio, 94% or more of a ferrite phase and 2% or less of a martensite phase, in which the mean grain size of ferrite is 10 μm or less, the Vickers hardness of ferrite is 140 or more, the mean grain size of carbide particles existing at the grain boundaries of ferrite is 0.5 μm or less, and the aspect ratio of carbide particles existing at the grain boundaries of ferrite is 2.0 or less.

[2] The high-strength galvanized steel sheet with high yield ratio having excellent ductility and stretch flange formability according to item [1], the steel sheet further having a microstructure, in which the number of crystal grains of ferrite containing 5 or more carbide particles is 0.005 grain/μm$^2$ or more, when the microstructure of the steel sheet is observed by using a scanning electron microscope at a magnification of 3000 times.

[3] The high-strength galvanized steel sheet with high yield ratio having excellent ductility and stretch flange formability according to item [1] or [2], the steel sheet further having a chemical composition, containing one or more chemical elements selected from the group consisting of, by mass %, Cr: 0.05% or more and 1.0% or less, V: 0.005% or more and 0.5% or less, Mo: 0.005% or more and 0.5% or less, Ni: 0.05% or more and 1.0% or less and Cu: 0.05% or more and 1.0% or less.

[4] The high-strength galvanized steel sheet with high yield ratio having excellent ductility and stretch flange formability according to any one of items [1] to [3], the steel sheet further having a chemical composition, containing one or more chemical elements selected from the group consisting of, by mass %, Ti: 0.01% or more and 0.1% or less, Nb: 0.01% or more and 0.1% or less and B: 0.0003% or more and 0.005% or less.

[5] The high-strength galvanized steel sheet with high yield ratio having excellent ductility and stretch flange formability according to any one of items [1] to [4], the steel sheet further having a chemical composition, containing one or more chemical elements selected from the group consisting of, by mass %, Ca: 0.001% or more and 0.005% or less and REM: 0.001% or more and 0.005% or less.

[6] The high-strength galvanized steel sheet with high yield ratio having excellent ductility and stretch flange formability according to any one of items [1] to [5], the steel sheet further having a chemical composition, containing one or more chemical elements selected from the group consisting of, by mass %, Ta: 0.001% or more and 0.010% or less and Sn: 0.002% or more and 0.2% or less.

[7] The high-strength galvanized steel sheet with high yield ratio having excellent ductility and stretch flange formability according to any one of items [1] to [6], the steel sheet further having a chemical composition, containing, by mass %, Sb: 0.002% or more and 0.2% or less.

[8] A method for manufacturing the high-strength galvanized steel sheet with high yield ratio having excellent ductility and stretch flange formability, the method including hot-rolling a steel slab having a chemical composition according to any one of items [1] or [3] to [7] with a finishing delivery temperature of 850° C. or higher, coiling the resulting hot-rolled steel sheet at a temperature in the range of 450° C. or higher and 600° C. or lower, thereafter pickling the steel sheet, annealing the steel sheet by holding the steel sheet at a temperature in the range of 600° C. or higher and 750° C. or lower for a holding time of 50 seconds or more and 550 seconds or less, thereafter cooling the steel sheet and then galvanizing the steel sheet.

[9] The method for manufacturing the high-strength galvanized steel sheet with high yield ratio having excellent ductility and stretch flange formability according to item [8], the method including performing alloying treatment at a temperature in the range of 470° C. or higher and 600° C. or lower after galvanizing has been performed.

DETAILED DESCRIPTION

We discovered a galvanized steel sheet with high yield ratio having not only high strength (tensile strength TS of 590 Mpa or more), but also excellent ductility and stretch flange formability.

By adding Si to a ferrite-based microstructure, we improved ductility due to an increase in the work hardening ability of a ferrite phase itself and improved stretch flange formability due to the solid-solution strengthening of a ferrite phase which causes achievement of strength and a decrease in difference in hardness between a ferrite phase and a second phase. Moreover, by controlling the size and the aspect ratio of carbide particles such as cementite existing at the grain boundaries of a ferrite phase, we decreased the number of microvoids which occur when drilling by using punching is performed and suppressed crack propagation which occurs when hole expansion working is performed, which resulted in a further improvement of stretch flange formability. In addition, by forming a microstructure in which the volume fraction of a martensite is kept low, we achieved high yield ratios. By the facts described above, we provide a steel sheet which has a strength level of a tensile strength of 590 MPa or more, high ductility and high stretch flange formability and, further, a high yield ratio.

As used herein, % expressing a chemical composition of steel always denotes mass %. In addition, "a high-strength galvanized steel sheet" refers to a galvanized steel sheet having a tensile strength TS of 590 MPa or more.

Moreover, regardless of whether or not alloying treatment is performed, a steel sheet which is plated with Zinc by using a galvanizing method is generically named a "galvanized steel sheet." That is to say our galvanized steel sheets include both a galvanized steel sheet manufactured without alloying treatment and a galvannealed steel sheet manufactured with alloying treatment.

Our galvanized steel sheets with high yield ratio have not only high strength (tensile strength TS of 590 MPa or more), but also excellent ductility and stretch flange formability. If the high-strength galvanized steel sheet is applied to, for example, structural members of automobiles, industrial utility is very large because fuel efficiency is expected to be improved by decreasing the weight of automobile bodies.

In general, it is well known that, although ductility can be achieved for the dual phase structure of soft ferrite and hard martensite, satisfactory stretch flange formability cannot be achieved because the difference in hardness between ferrite and martensite is too large. In addition, it is well known that a high yield ratio cannot be achieved for the DP structure (ferrite+martensite). On the other hand, it is well known that, although a high stretch flange formability can be achieved by making a ferrite-based microstructure in which a second phase consists of carbide such as cementite, and by reducing the amount of interface between different phases between which difference in hardness is large, and although high yield ratio can be achieved because martensite is not contained, but satisfactory strength and ductility cannot be achieved. Therefore, we focused on achieving strength due to solid-solution strengthening of ferrite and ductility due to the improvement of the work hardening ability of ferrite itself by making a ferrite-based microstructure having a second phase in which the volume fraction of martensite is low and in which carbide such as cementite are the main constituents and by positively utilizing Si. Moreover, we focused on the further improvement of stretch flange formability by reducing the size and the aspect ratio of carbide particles such as cementite which exists at the grain boundaries of ferrite because the number of microvoids which occur when drilling by punching is performed is reduced and, further, because crack propagation which occurs when hole expansion working is performed is suppressed. As a result, we provide steel sheets having a strength level of tensile strength TS of 590 MPa or more having high ductility and high stretch flange formability and, further, a high yield ratio.

Then, our steel sheets have a chemical composition containing, by mass %, C, 0.04% or more and 0.13% or less, Si: 0.9% or more and 2.3% or less, Mn: 0.8% or more and 2.4% or less, P: 0.1% or less, S: 0.01% or less, Al: 0.01% or more and 0.1% or less, N, 0.008% or less, and the balance being Fe and inevitable impurities and by a microstructure including, in terms of area ratio, 94% or more of a ferrite phase and 2% or less of a martensite ferrite phase, in which the mean grain size of ferrite is 10 μm or less, the Vickers hardness of ferrite is 140 or more, the mean grain size of carbide particles existing at the grain boundaries of ferrite is 0.5 μm or less, and the aspect ratio of carbide particles existing at the grain boundaries of ferrite is 2.0 or less.

(1) First, a Chemical Composition Will be Described.

C, 0.04% or More and 0.13% or Less

C is a chemical element which forms austenite, forms a microstructure multi-phase and plays the main role in the improvement of strength and ductility. In the case where C content is less than 0.04%, it is difficult to achieve the specified strength. On the other hand, excessive addition of more than 0.13% of C causes a decrease in stretch flange formability because the number of carbide particles which become the origins of stretch flange cracks is increased. Therefore, the C content is 0.04% or more and 0.13% or less, preferably 0.06% or more and 0.11% or less.

Si: 0.9% or More and 2.3% or Less

Si is a chemical element which forms ferrite and effective for solid-solution strengthening of ferrite. A Si content of 0.9% or more is necessary to improve the balance of strength and ductility and achieve a desired strength for the ferrite. However, excessive addition of Si causes a decrease in surface quality due to generation of red scale and so forth and a decrease in wettability and adhesion of coatings. Therefore, the Si content is 0.9 or more and 2.3% or less, preferably 1.0% or more and 1.8% or less.

Mn: 0.8% or More and 2.4% or Less

Mn is a chemical element effective to strengthen steel. Moreover, Mn is a chemical element which forms austenite and, in the case where Mn content is less than 0.8%, it is difficult to achieve the desired strength. On the other hand, excessive addition of more than 2.4% of Mn causes an increase in the number of carbide particles which become the origins of stretch flange cracks, which results in a decrease in stretch flange formability, and results in an increase in cost due to the recent steep price rise of Mn. Therefore, the Mn content is 0.8 or more and 1.8% or less, preferably 1.0% or more and 1.8% or less.

P: 0.1% or Less

P is a chemical element effective to strengthen steel, but excessive addition of more than 0.1% of P causes embrittlement due to grain boundaries segregation and a decrease in crashworthiness. In addition, excessive addition of more than 0.1% of P causes a significant decrease in the alloying rate. Therefore, the P content is 0.1% or less.

S: 0.01% or Less

Although it is preferable that S content be as small as possible, because S forms inclusions such as MnS which results in formation of cracks in the direction of metal flow, the S content is 0.1% or less from the viewpoint of manufacturing cost.

Al: 0.01% or More and 0.1% or Less

Al is a chemical element added for the purpose of deoxidization and effective for refinement of a steel microstructure after hot rolling has been performed by forming AlN and improving material quality. As, in the case where Al content is less than 0.01%, the effect of adding Al is minor, the lower limit of Al content is set to be 0.01%. However, as excessive addition of Al causes a decrease in surface quality and formability and an increase in cost, the Al content is 0.1% or less.

N, 0.008% or Less

It is preferable that N content be as small as possible because N is a chemical element which most largely decreases the aging resistance of steel, and the decrease in aging resistance is significant if N content is larger than 0.008%. Therefore, the N content is 0.008% or less.

The remainder consists of Fe and inevitable impurities. However, the alloy chemical elements described below may be added as needed to the chemical composition described above.

One or More Elements Selected from the Group Consisting of Cr: 0.05% or More and 1.0% or Less, V: 0.005 or More and 0.5% or Less, Mo: 0.005% or More and 0.5% or Less, Ni: 0.05% or More and 1.0% or Less and Cu: 0.05% or More and 1.0% or Less Cr, V, Mo, Ni and Cu may be added to strengthen steel because they are chemical elements effective for strengthening steel. The effect is realized if Cr 0.05% or more, if V content is 0.005% or more, if Mo content is 0.005% or more, if Ni content is 0.05% or more, or if Cu content is 0.05% or more. However, excessive addition of more than 1.0% of Cr, excessive addition of more than 0.5% of V, excessive addition of more than 0.5% of Mo, excessive addition of more than 1.0% of Ni or excessive addition of more than 1.0% of Cu raises concerns that there may be a decrease in ductility and stretch flange formability due to a significant increase in strength caused by the presence of an excessively large proportion of the second phase, and an increase in cost at the same time. Therefore, in the case where these chemical elements are added, the Cr content is 0.05% or more and 1.0% or less, the V content is 0.005% or more and 0.5% or less, the Mo content is 0.005% or more and 0.5% or less, the Ni content is 0.05% or more and 1.0% or less and the Cu content is 0.05% or more and 1.0% or less.

Moreover, one or more chemical elements selected from the group consisting of Ti, Nb and B described below may be added.

One or More Elements Selected from the Group Consisting of Ti: 0.01 or More and 0.1 or Less, Nb: 0.01% or More and 0.1% or Less and B: 0.0003% or More and 0.005% or Less Ti and Nb are chemical elements effective to strengthen steel. This effect is realized, if Ti content is 0.01% or more, or if Nb content is 0.1% or more. However, excessive addition of more than 0.1% of Ti or excessive addition of more than 0.1% of Nb raises concerns that there may be a decrease in ductility and stretch flange formability due to a significant increase in strength caused by the presence of an excessively large proportion of the second phase, and an increase in cost at the same time. Therefore, in the case where Ti and Nb are added, the Ti con-tent is 0.01% or more and 0.1% or less and the Nb content is 0.01% or more and 0.1% or less.

B is a chemical element effective to strengthen steel, and this effect is realized if B content is 0.0003% or more. However, excessive addition of more than 0.005% of B raises concerns that there may be a decrease in ductility and stretch flange formability due to a significant increase in strength caused by the presence of an excessively large proportion of the second phase, and an increase in cost at the same time. Therefore, in the case where B is added, the B content is 0.0003% or more and 0.005% or less.

One or Both Elements Selected from the Group Consisting of Ca: 0.001% or More and 0.005% or Less and REM: 0.001% or More and 0.005% or Less Ca and REM are chemical elements effective to reduce the negative effect of sulfides on stretch flange formability due to globularizing of sulfides. It is necessary that the content of Ca is 0.001% or more and the content of REM is 0.001% or more to realize this effect. However, excessive addition of Ca or REM causes an increase in inclusions and so forth, which results in surface and internal defects and so forth. Therefore, in the case where Ca and REM are added, the Ca content is 0.001% or more and 0.005% or less and the REM content is 0.001 or more and 0.005% or less.

One or Both Elements Selected from the Group Consisting of Ta: 0.001% or More and 0.010% or Less, Sn: 0.002% or More and 0.2% or Less It is thought that Ta, along with Ti and Nb, not only contributes to strengthening by forming alloy carbide and alloy carbonitride, but is also effective to stabilize the contribution of Nb to strengthening via precipitation strengthening by significantly suppressing coarsening of precipitates by forming a solid solution in Nb carbide or Nb carbonitride and forming complex precipitates such as (Nb, Ta)(C, N). Therefore, in the case where Ta is added, it is preferable that Ta content is 0.001% or more. However, excessive addition of Ta causes not only the saturation of the effect of stabilizing the precipitates described above but also an increase in cost. Therefore, in the case where Ta is added, it is preferable that Ta content is 0.010% or less.

Sn may be added from the viewpoint of suppressing nitriding or oxidation of the surface of a steel sheet or decarburization which is caused by oxidation in the surface layer of a steel sheet, the depth of which is 10 μm. A decrease in the amount of martensite formed at the surface of a steel sheet is avoided by suppressing nitriding or oxidation described above, which results in the improvement of fatigue property and aging resistance. In the case where Sn is added from the viewpoint of suppressing nitriding or oxidation, it is preferable that Sn content is 0.002% or more, and that Sn content is 0.2% or less because excessive addition of more than 0.2% of Sn causes a decrease in the toughness of steel.

Sb: From 0.002 to 0.2%

Sb may be added, as well as Sn, from the viewpoint of suppressing nitriding or oxidation of the surface a steel sheet or decarburization which is caused by oxidation in the surface layer of a steel sheet, the depth of which is 10 μm. A decrease in the amount of martensite formed at the surface of a steel sheet is avoided by suppressing nitriding or oxidation mentioned above, which results in improvement of fatigue resistance and aging resistance. In the case where Sb is added from the viewpoint of suppressing nitriding or oxidation, it is preferable that Sb content be 0.002% or more, and that Sb content be 0.2% or less, because excessive addition of more than 0.2% of Sb causes a decrease in toughness of steel.

(2) Second, the Microstructure Will be Described.
The Area Ratio of Ferrite: 94% or More It is necessary that the area ratio of ferrite is 94% or more to achieve satisfactory ductility and stretch flange formability.

The Area Ratio of Martensite: 2% or Less

It is necessary that the area ratio of martensite is 2% or less to achieve high yield ratio and satisfactory stretch flange formability.

The Mean Grain Size of Ferrite: 10 μm or Less

It is necessary that the mean grain size of ferrite is 10 μm or less to achieve the desired strength.

The Vickers Hardness of Ferrite: 140 or More

It is necessary that the Vickers hardness of ferrite is 140 or more to achieve the desired strength and satisfactory stretch flange formability. It is preferable that the Vickers hardness of ferrite is 150 or more.

The Mean Grain Size of Carbide Particles Existing at the Grain Boundaries of Ferrite: 0.5 μm or Less It is necessary that the mean grain size of carbide particles existing at the grain boundaries of ferrite is 0.5 μm or less to achieve satisfactory stretch flange formability.

The Aspect Ratio of Carbide Particles Existing at the Grain Boundaries of Ferrite: 2.0 or Less It is necessary that the aspect ratio of carbide particles existing at the grain boundaries of ferrite is 2.0 or less to achieve satisfactory stretch flange formability.

The number of crystal grains of ferrite containing 5 or more carbide particles, when the microstructure of the steel sheet being observed by using a scanning electron microscope at a magnification of 3000 times: 0.005 grain/μm$^2$ or more.

It is preferable that the number of crystal grains of ferrite containing 5 or more carbide particles is 0.005 grain/μm$^2$ or more when the microstructure of the steel sheet being observed by using a scanning electron microscope at a magnification of 3000 times. The reason why the observation is performed at a magnification of 3000 times is that this magnification is suitable to observe carbide particles effective to increase yield ratio and calculate the number of the carbide particles.

It is possible for bainitic ferrite, pearlite, globular pearlite and retained austenite and so forth to be formed in addition to ferrite, martensite and carbide such as cementite as long as the conditions such as those regarding the area ratio of ferrite and the area ratio of martensite are satisfied as described above.

(3) Third, the Method for Manufacturing Will be Described.

Our high-strength galvanized steel sheet can be manufactured by hot-rolling a steel slab having a chemical composition conforming to the composition range described above with a finishing delivery temperature of 850° C. or higher, coiling the resulting hot-rolled steel sheet at a temperature in the range of 450° C. or higher and 600° C. or lower, thereafter pickling the steel sheet, annealing the steel sheet by holding the steel sheet at a temperature in the range of 600° C. or higher and 750° C. or lower for a holding time of 50 seconds or more and 550 seconds or less, thereafter cooling the steel sheet, then galvanizing the steel sheet, and, as needed, performing alloying treatment of the Zinc plating at a temperature in the range of 470° C. or higher and 600° C. or lower after galvanizing has been performed.

The method will be described in detail hereafter.

The steel having a chemical composition described above is smelted by using a well-known common process, thereafter made into a slab through a slabbing process or a continuous casting process, and the slab is hot-rolled into a hot-rolled steel sheet. Although there are no particular limitations on heating of the slab, for example, the slab may be heated at a temperature in the range of 1100° C. or higher and 1300° C. or lower, thereafter hot-rolling is performed with a finishing delivery temperature of 850° C. or higher and then the hot rolled sheet is coiled at a temperature in the range of 450° C. or higher and 600° C. or lower.

Finishing Delivery Temperature of Hot Rolling: 850° C. Or Higher

In the case where a finishing delivery temperature of hot rolling is lower than 850° C., there is a microstructure in which ferrite is elongated in the direction of rolling and in which the aspect ratio of carbide particles such as cementite is large, which results in a decrease in stretch flange formability. Therefore, the finishing delivery temperature of hot rolling is 850° C. or higher.

Coiling Temperature: 450° C. Or Higher and 600° C. Or Lower

In the case where a coiling temperature is lower than 450° C., the major part of a hot-rolled microstructure is constituted of a hard phase such as martensite and bainite and, finally, the microstructure has a large amount of tempered martensite and bainite which results in a decrease in ductility and stretch flange formability due to a significant increase in strength. Moreover, when the microstructure of the steel sheet is observed by using a scanning electron microscope at a magnification of 3000 times after annealing treatment has been performed after coiling, it is difficult to achieve that the number of crystal grains of ferrite containing 5 or more carbide particles is 0.005 grain/μm$^2$ or more, which makes it impossible to achieve high yield ratio. In addition, in the case where a coiling temperature is higher than 600° C., there is an increase in the grain size of ferrite which makes it impossible to achieve the desired strength. Therefore, the coiling temperature is 450° C. or higher and 600° C. or lower.

The hot-rolled steel sheet obtained as describe above is pickled by using a well-known common method, then, as needed, pre-treatment such as degreasing is performed, and thereafter annealing is performed as described below.

Annealing: At a Temperature in the Range of 600° C. Or Higher and 750° C. Or Lower for a Holding Time of 50 Seconds or More and 550 Seconds or Less Annealing is performed at a temperature of 600° C. or higher and 750° C. or lower, specifically for a single phase of ferrite, for a holding time of 50 seconds or more and 550 seconds or less. In the case where an annealing temperature is lower than 600° C. or where a holding time (annealing time) is less than 50 seconds, pearlite formed when hot-rolling is performed is retained, which results in a decrease in ductility. On the other hand, in the case where an annealing temperature is higher than 750° C., annealing is performed in the range for the dual phase of ferrite and austenite, almost the entire part of the second phase is finally transformed into martensite, which makes it impossible to achieve a high yield ratio. In addition, in the case where a holding time (annealing time) is more than 550 seconds, grain size becomes excessively large, which makes it difficult to achieve the desired strength. Therefore, annealing is performed at a temperature of 600° C. or higher and 750° C. or lower for a holding time of 50 seconds or more and 550 seconds or less.

After annealing has been performed, cooling is performed, and thereafter the steel sheet is dipped into a plating bath of a common temperature and galvanized with a coating weight being adjusted by a method such as gas wiping.

When a galvannealed steel sheet, into the coated layer of which Fe from the steel sheet defuses, is manufactured to achieve spot weldability and paint adhesion, alloying treatment of Zinc plating is performed at a temperature of 470° C. or higher and 600° C. or lower, after galvanizing has been performed.

In the case where a temperature for alloying treatment is higher than 600° C., the grain size of ferrite becomes excessively large, which makes it difficult to achieve the desired strength. In addition, in the case where a temperature for alloying treatment is lower than 470° C., alloying does not progress, which makes it impossible to obtain a galvannealed steel sheet.

Incidentally, the steel sheet may be heat-treated in any kind of apparatus in the series of heat treatments in the manufacturing method as long as a heat history satisfies the limits described above. In addition, in the case where alloying treatment is performed after galvanizing has been performed, our methods include skin pass rolling of the steel sheet to correct the shape of the steel sheet after alloying treatment has been performed.

EXAMPLES

The steel having a chemical composition given in Table 1 and the remainder consisting of Fe and inevitable impurities was smelted by using a revolving furnace and cast into a slab by using a continuous casting process. The obtained slab was heated up to 1200° C. and thereafter hot-rolled into a hot-rolled steel sheet having a thickness of 2.3 mm or more and 3.2 mm or less. Then, the steel sheet was coiled at a coiling temperature given in Table 2. Then, the obtained hot-rolled steel sheet was pickled and annealed under the conditions given in Table 2 by using a continuous galvanizing line, and thereafter the steel sheet was galvanized. Further, the galvanized steel sheet was made into a galvanized steel sheet which underwent alloying treatment (a galvannealed steel sheet, indicated by GA in the row of Kind of Plating in Table 3) under the conditions given in Table 2. Some of the galvanized steel sheets were galvanized steel sheets which did not undergo alloying treatment (indicated by GI in the row of Kind of Plating in Table 3). The Al content in a galvanizing bath was 0.14%, and the temperature of the bath was 460° C. The coating weight per side was adjusted to 45 g/m$^2$, and the condition of alloying treatment was adjusted so that the Fe content in the coated layer was 9% or more and 12% or less.

TABLE 1

| Steel Grade | Chemical Composition (mass %) | | | | | | | | | | |
|---|---|---|---|---|---|---|---|---|---|---|---|
| | C | Si | Mn | Al | P | S | N | Ni | Cu | Cr | V |
| A | 0.090 | 1.41 | 1.48 | 0.026 | 0.012 | 0.0016 | 0.0030 | — | — | — | — |
| B | 0.111 | 1.28 | 1.29 | 0.029 | 0.013 | 0.0019 | 0.0031 | — | — | — | — |
| C | 0.061 | 1.32 | 1.66 | 0.031 | 0.022 | 0.0024 | 0.0034 | — | — | — | — |
| D | 0.052 | 1.40 | 1.38 | 0.028 | 0.020 | 0.0017 | 0.0036 | — | — | 0.15 | 0.045 |
| E | 0.077 | 1.50 | 1.32 | 0.031 | 0.013 | 0.0026 | 0.0028 | — | — | — | — |
| F | 0.089 | 1.12 | 1.42 | 0.029 | 0.009 | 0.0025 | 0.0031 | — | — | — | — |
| G | 0.086 | 1.41 | 1.55 | 0.027 | 0.013 | 0.0017 | 0.0033 | — | — | — | — |
| H | 0.096 | 1.22 | 1.21 | 0.031 | 0.008 | 0.0024 | 0.0031 | 0.17 | 0.14 | — | — |
| I | 0.151 | 1.45 | 1.51 | 0.033 | 0.020 | 0.0020 | 0.0032 | — | — | — | — |
| J | 0.022 | 1.36 | 1.81 | 0.038 | 0.023 | 0.0022 | 0.0035 | — | — | — | — |
| K | 0.088 | 0.79 | 1.75 | 0.031 | 0.018 | 0.0027 | 0.0031 | — | — | — | — |
| L | 0.050 | 1.18 | 2.51 | 0.028 | 0.016 | 0.0019 | 0.0033 | — | — | — | — |
| M | 0.067 | 1.44 | 0.68 | 0.028 | 0.018 | 0.0020 | 0.0031 | — | — | — | — |
| N | 0.101 | 1.12 | 1.62 | 0.022 | 0.012 | 0.0012 | 0.0027 | — | — | — | — |
| O | 0.091 | 1.41 | 1.52 | 0.028 | 0.016 | 0.0018 | 0.0031 | — | — | — | — |
| P | 0.079 | 1.33 | 1.66 | 0.026 | 0.017 | 0.0019 | 0.0028 | — | — | — | — |
| Q | 0.089 | 1.45 | 1.57 | 0.028 | 0.016 | 0.0017 | 0.0028 | — | — | — | — |
| R | 0.089 | 1.22 | 1.45 | 0.022 | 0.012 | 0.0018 | 0.0026 | — | — | — | — |

TABLE 1-continued

| Steel Grade | Chemical Composition (mass %) | | | | | | | | | Note |
|---|---|---|---|---|---|---|---|---|---|---|
| | Mo | Nb | Ti | B | Ca | REM | Ta | Sn | Sb | |
| A | — | — | — | — | — | — | — | — | — | Example |
| B | — | — | — | — | — | — | — | — | — | Example |
| C | — | — | — | — | — | — | — | — | — | Example |
| D | — | — | — | — | — | — | — | — | — | Example |
| E | 0.10 | — | — | — | — | — | — | — | — | Example |
| F | — | 0.026 | — | — | — | — | — | — | — | Example |
| G | — | — | 0.019 | 0.0020 | — | — | — | — | — | Example |
| H | — | — | — | — | — | — | — | — | — | Example |
| I | — | — | — | — | — | — | — | — | — | Comparative Example |
| J | — | — | — | — | — | — | — | — | — | Comparative Example |
| K | — | — | — | — | — | — | — | — | — | Comparative Example |
| L | — | — | — | — | — | — | — | — | — | Comparative Example |
| M | — | — | — | — | — | — | — | — | — | Comparative Example |
| N | — | — | — | — | 0.0020 | 0.0010 | — | — | — | Example |
| O | — | 0.016 | — | — | — | — | 0.007 | — | — | Example |
| P | — | 0.011 | — | — | — | — | — | 0.009 | — | Example |
| Q | — | — | — | — | — | — | 0.006 | — | — | Example |
| R | — | — | — | — | — | — | — | — | 0.008 | Example |

Under Line: indicates out of range

TABLE 2

| No. | Steel Grade | Finishing Delivery Temperature of Hot Rolling ° C. | Coiling Temperature ° C. | Annealing Temperature ° C. | Annealing Time second | Alloy Treating Temperature ° C. | Note |
|---|---|---|---|---|---|---|---|
| 1 | A | 890 | 530 | 720 | 280 | 545 | Example |
| 2 | A | 880 | 470 | 700 | 270 | 540 | Example |
| 3 | A | 890 | 530 | 680 | 280 | 550 | Example |
| 4 | A | 870 | 520 | 710 | 260 | — | Example |
| 5 | A | 790 | 520 | 700 | 220 | 550 | Comparative Example |
| 6 | A | 880 | 700 | 720 | 260 | 550 | Comparative Example |
| 7 | A | 900 | 300 | 725 | 280 | 540 | Comparative Example |
| 8 | A | 890 | 500 | 850 | 260 | 555 | Comparative Example |
| 9 | A | 890 | 540 | 500 | 250 | 560 | Comparative Example |
| 10 | B | 890 | 525 | 710 | 240 | 550 | Example |
| 11 | B | 880 | 540 | 680 | 700 | 540 | Comparative Example |
| 12 | B | 875 | 500 | 720 | 5 | 555 | Comparative Example |
| 13 | C | 890 | 530 | 705 | 280 | 540 | Example |
| 14 | C | 870 | 490 | 680 | 300 | 650 | Comparative Example |
| 15 | D | 880 | 520 | 680 | 250 | 540 | Example |
| 16 | E | 900 | 480 | 720 | 290 | 545 | Example |
| 17 | F | 890 | 500 | 710 | 300 | 540 | Example |
| 18 | G | 870 | 510 | 690 | 270 | 545 | Example |
| 19 | H | 870 | 540 | 720 | 220 | 560 | Example |
| 20 | I | 880 | 520 | 670 | 220 | 540 | Comparative Example |
| 21 | J | 885 | 510 | 710 | 250 | 545 | Comparative Example |
| 22 | K | 875 | 530 | 690 | 230 | 550 | Comparative Example |
| 23 | L | 890 | 540 | 700 | 210 | 545 | Comparative Example |
| 24 | M | 895 | 510 | 730 | 280 | 540 | Comparative Example |
| 25 | N | 900 | 550 | 700 | 280 | 540 | Example |
| 26 | O | 890 | 520 | 710 | 300 | 535 | Example |
| 27 | P | 910 | 530 | 720 | 270 | 530 | Example |
| 28 | Q | 900 | 540 | 720 | 260 | 540 | Example |
| 29 | R | 920 | 500 | 700 | 280 | 545 | Example |

Under Line: indicates out of range

The area ratios of ferrite and martensite were derived as the mean values of area ratios calculated for 10 microscopic fields for each phase by using Image-Pro manufactured by Media Cybernetics, Inc. from the data observed by using SEM (Scanning Electron Microscope) at a magnification of 2000 times in 10 fields for each specimen which was taken at a position of a quarter of the thickness in a cross section in the thickness direction parallel to the rolling direction of the obtained galvanized steel sheet and which was corroded with nital having the nitric acid concentration of 3% after being polished. The mean grain size of ferrite was derived as the mean value of equivalent circle diameter for the area of each crystal grain by using Image-Pro described above. In addition, the mean grain size of the carbide particles existing at the grain boundaries of ferrite was derived as the mean value of equivalent circle diameter for the area of each of 20 carbide particles existing at the grain boundaries of ferrite observed by using TEM (Transmission Electron Microscope). Moreover, the aspect ratio of carbide particles existing at the grain boundaries of ferrite was derived as the mean value of the ratio of the minor axis to the major axis calculated for each carbide particle by using Image-Pro described above from the data observed by using TEM for 20 carbide particles existing at the grain boundaries of ferrite.

In addition, the number of crystal grains of ferrite containing 5 or more carbide particles was derived as a number per 1 μm² converted from the number of crystal grains of ferrite containing 5 or more carbide particles observed in the total area of 10000 μm² for 10 fields in steel microstructure by using SEM at a magnification of 3000 times.

The Vickers hardness of ferrite was observed by using a Vickers hardness meter under the conditions in which a load was 2 g and a loading time was 15 seconds. The Vickers hardness of ferrite was represented by the mean value of the hardness observed for 10 grains around the center of ferrite crystal grain.

Tensile test was carried out while conforming to JIS Z 2241 with JIS No. 5 tensile test pieces cut out of the obtained hot-rolled steel sheet so that the tensile direction was in the direction at a right angle to the rolling direction to observe YS (yield strength), TS (tensile strength) and EL (total elongation). YR (yield ratio) is defined by YS/TS. Ductility was estimated in reference to a value of TS×EL. A case where YR≥0.75 and TS×EL≥19000 MPa·% was judged as satisfactory.

Moreover, stretch flange formability was observed for the galvanized steel sheet obtained as described above. Hole expanding test was carried out while conforming to The Japan Iron and Steel Federation Standard JFS T 1001. A hole having a diameter of 10 mm was punched in a sample of 100 mm×100 mm cut out of the obtained steel sheet, with a clearance of 12%±1%. Thereafter, the sample was set in a die having an internal diameter of 75 mm with a blank holding force of 8 tons and a conical punch having a vertex angle of 60° was made to penetrate into the hole. Then, the diameter of the hole was measured at the cracking limit and stretch flange formability was estimated in reference to a value of a limit hole expansion ratio λ (%) which was derived from the equation described below:

Limit hole expansion ratio $\lambda(\%) = \{(D_f - D_0)/D_0\} \times 100$.

$D_f$ denotes the hole diameter (mm) at the cracking limit and $D_o$ denotes the initial hole diameter (mm). A case where λ≥80 (%) was judged as satisfactory.

The results obtained as described above are given in Tables 3.

TABLE 3

| No. | Steel Grade | Thickness (mm) | Kind of Plating | Area Ratio of Ferrite (%) | Area Ratio of Martensite (%) | Mean Grain Size of Ferrite (mm) | Vickers Hardness of Ferrite | Mean Grain Size of Carbide Particles Existing at the Grain Boundaries of Ferrite (mm) | Aspect Ratio of Carbide Particles Existing at the Grain Boundaries of Ferrite | Number of Ferrite Crystal Grains Containing 5 or More Carbide Particles (Grain/mm²) | YS (MPa) | TS (MPa) | EL (%) | TS·EL (MPa·%) | YR | λ (%) | Note |
|---|---|---|---|---|---|---|---|---|---|---|---|---|---|---|---|---|---|
| 1 | A | 2.6 | GA | 96.8 | 0.3 | 7.2 | 156 | 0.28 | 1.4 | 0.012 | 514 | 607 | 33.8 | 20517 | 0.85 | 123 | Example |
| 2 | A | 2.6 | GA | 99.0 | 0.2 | 4.8 | 162 | 0.14 | 1.2 | 0.014 | 520 | 626 | 33.5 | 20971 | 0.83 | 118 | Example |
| 3 | A | 2.6 | GA | 97.1 | 0.4 | 5.9 | 158 | 0.22 | 1.5 | 0.011 | 512 | 615 | 33.8 | 20787 | 0.83 | 120 | Example |
| 4 | A | 2.6 | GI | 95.9 | 0.9 | 7.0 | 155 | 0.31 | 1.4 | 0.012 | 515 | 622 | 34.8 | 21646 | 0.83 | 93 | Example |
| 5 | A | 2.6 | GA | 97.8 | 0.5 | 10.8 | 147 | 0.38 | 2.8 | 0.008 | 521 | 578 | 32.2 | 18612 | 0.90 | 62 | Comparative Example |
| 6 | A | 2.6 | GA | 97.5 | 0.4 | 12.2 | 143 | 0.29 | 1.7 | 0.003 | 458 | 531 | 35.4 | 18797 | 0.86 | 90 | Comparative Example |
| 7 | A | 2.6 | GA | 62.5 | 7.8 | 8.6 | 228 | 0.26 | 1.6 | 0.020 | 528 | 739 | 23.7 | 17514 | 0.71 | 49 | Comparative Example |
| 8 | A | 2.6 | GA | 86.8 | 4.5 | 8.5 | 146 | 0.22 | 1.4 | 0.002 | 418 | 615 | 30.1 | 18512 | 0.68 | 62 | Comparative Example |
| 9 | A | 2.6 | GA | 92.1 | 0.9 | 8.2 | 147 | 0.22 | 1.2 | 0.013 | 520 | 621 | 25.9 | 16084 | 0.84 | 68 | Comparative Example |
| 10 | B | 2.6 | GA | 96.0 | 0.2 | 5.1 | 144 | 0.28 | 1.3 | 0.012 | 520 | 611 | 34.2 | 20896 | 0.85 | 122 | Example |
| 11 | B | 2.6 | GA | 97.9 | 0.4 | 12.1 | 149 | 0.29 | 1.5 | 0.003 | 462 | 542 | 33.3 | 18049 | 0.85 | 89 | Comparative Example |
| 12 | B | 2.6 | GA | 91.8 | 0.8 | 8.3 | 145 | 0.21 | 1.2 | 0.011 | 519 | 618 | 26.2 | 16192 | 0.84 | 83 | Comparative Example |
| 13 | C | 2.8 | GA | 96.2 | 0.3 | 5.7 | 150 | 0.26 | 1.2 | 0.010 | 510 | 609 | 34.4 | 20950 | 0.84 | 128 | Example |
| 14 | C | 2.8 | GA | 98.5 | 0.1 | 11.9 | 142 | 0.12 | 1.5 | 0.002 | 445 | 545 | 32.2 | 17549 | 0.82 | 88 | Comparative Example |
| 15 | D | 2.6 | GA | 95.8 | 0.4 | 5.8 | 159 | 0.22 | 1.2 | 0.013 | 512 | 610 | 34.1 | 20801 | 0.84 | 120 | Example |
| 16 | E | 2.9 | GA | 96.4 | 0.6 | 4.9 | 160 | 0.19 | 1.2 | 0.015 | 520 | 628 | 33.4 | 20975 | 0.83 | 115 | Example |

TABLE 3-continued

| No. | Steel Grade | Thickness (mm) | Kind of Plating | Area Ratio of Ferrite (%) | Area Ratio of Martensite (%) | Mean Grain Size of Ferrite (mm) | Vickers Hardness of Ferrite | Mean Grain Size of Carbide Particles Existing at the Grain Boundaries of Ferrite (mm) | Aspect Ratio of Carbide Particles Existing at the Grain Boundaries of Ferrite | Number of Ferrite Crystal Grains Containing 5 or More Carbide Particles (Grain/mm$^2$) | YS (MPa) | TS (MPa) | EL (%) | TS'EL (MPa · %) | YR | 1 (%) | Note |
|---|---|---|---|---|---|---|---|---|---|---|---|---|---|---|---|---|---|
| 17 | F | 3.2 | GA | 96.2 | 0.7 | 6.0 | 154 | 0.26 | 1.3 | 0.016 | 521 | 612 | 34.2 | 20930 | 0.85 | 112 | Example |
| 18 | G | 2.8 | GA | 95.7 | 0.3 | 5.6 | 150 | 0.22 | 1.4 | 0.016 | 523 | 615 | 34.1 | 20972 | 0.85 | 109 | Example |
| 19 | H | 2.3 | GA | 96.3 | 0.5 | 7.2 | 149 | 0.21 | 1.2 | 0.014 | 515 | 610 | 33.5 | 20435 | 0.84 | 121 | Example |
| 20 | I | 2.6 | GA | 94.9 | 1.5 | 1.6 | 150 | <u>1.12</u> | <u>2.4</u> | 0.014 | 545 | 645 | 30.1 | 19415 | 0.84 | 53 | Comparative Example |
| 21 | J | 2.6 | GA | 98.9 | 0.2 | 9.1 | <u>130</u> | 0.11 | 1.2 | 0.003 | 436 | 531 | 33.8 | 17948 | 0.82 | 71 | Comparative Example |
| 22 | K | 2.6 | GA | 95.4 | 0.4 | 7.8 | <u>122</u> | 0.23 | 1.4 | 0.002 | 422 | 538 | 28.9 | 15548 | 0.78 | 70 | Comparative Example |
| 23 | L | 2.6 | GA | 94.4 | 1.8 | 7.2 | 146 | <u>0.82</u> | 1.7 | 0.010 | 512 | 623 | 31.2 | 19438 | 0.82 | 41 | Comparative Example |
| 24 | M | 2.6 | GA | 98.5 | 0.1 | 8.1 | <u>135</u> | 0.19 | 1.3 | 0.002 | 419 | 541 | 31.5 | 17042 | 0.77 | 69 | Comparative Example |
| 25 | N | 2.6 | GA | 97.4 | 0.2 | 6.2 | 161 | 0.13 | 1.3 | 0.013 | 510 | 618 | 34.2 | 21136 | 0.83 | 133 | Example |
| 26 | O | 2.6 | GA | 97.8 | 0.4 | 5.1 | 159 | 0.15 | 1.2 | 0.016 | 538 | 638 | 33.1 | 21118 | 0.84 | 117 | Example |
| 27 | P | 2.6 | GA | 97.6 | 0.3 | 5.8 | 164 | 0.16 | 1.4 | 0.014 | 523 | 601 | 34.3 | 20614 | 0.87 | 114 | Example |
| 28 | Q | 2.6 | GA | 97.9 | 0.3 | 6.3 | 163 | 0.17 | 1.1 | 0.012 | 519 | 603 | 34.6 | 20864 | 0.86 | 107 | Example |
| 29 | R | 2.6 | GA | 98.1 | 0.2 | 6.4 | 161 | 0.15 | 1.2 | 0.013 | 520 | 613 | 33.8 | 20719 | 0.85 | 112 | Example |

Under Line: indicates out of range

Our high-strength galvanized steel sheets of the Examples all have TS of 590 MPa or more, excellent ductility and stretch flange formability and high yield ratio. On the other hand, the Comparative Examples are inferior in one or more of strength, ductility, stretch flange formability and yield ratio.

INDUSTRIAL APPLICABILITY

A high-strength galvanized steel sheet with high yield ratio having not only high strength (TS of 590 MPa or more), but also excellent ductility and stretch flange formability can be obtained. By using the high-strength galvanized steel sheet, fuel efficiency is expected to be improved by decreasing the weight of automobile bodies, if the steel sheet is applied to structural members of automobiles.

The invention claimed is:

1. A galvanized steel sheet comprising a chemical composition containing, by mass %, C: 0.04% or more and 0.13% or less, Si: 0.9% or more and 2.3% or less, Mn: 0.8% or more and 2.4% or less, P: 0.1% or less, S: 0.01% or less, Al: 0.01% or more and 0.1% or less, N: 0.008% or less, and the balance being Fe and inevitable impurities and a microstructure including, in terms of area ratio, 94% or more of a ferrite phase and 2% or less of a martensite phase, wherein mean grain size of ferrite is 10μm or less, Vickers hardness of ferrite is 140 or more, mean grain size of carbide particles existing at grain boundaries of ferrite is 0.5 μm or less, and aspect ratio of carbide particles existing at the grain boundaries of ferrite is 2.0 or less.

2. The galvanized steel sheet according to claim 1, wherein the microstructure has a number of crystal grains of ferrite containing 5 or more carbide particles in the crystal grains of 0.005 grain/μm$^2$ or more when the microstructure is observed by using a scanning electron microscope at a magnification of 3000 times.

3. The galvanized steel sheet according to claim 2, wherein the chemical composition further comprises one or more chemical elements selected from the group consisting of, by mass %, Cr: 0.05% or more and 1.0% or less, V: 0.005% or more and 0.5% or less, Mo: 0.005% or more and 0.5% or less, Ni: 0.05% or more and 1.0% or less and Cu: 0.05% or more and 1.0% or less.

4. The galvanized steel sheet according to claim 2, wherein the chemical composition further comprises one or more chemical elements selected from the group consisting of, by mass %, Ti: 0.01% or more and 0.1% or less, Nb: 0.01% or more and 0.1% or less and B: 0.0003% or more and 0.005% or less.

5. The galvanized steel sheet according to claim 2, wherein the chemical composition further comprises one or more chemical elements selected from the group consisting of, by mass %, Ca: 0.001% or more and 0.005% or less and REM: 0.001% or more and 0.005% or less.

6. The galvanized steel sheet according to claim 2, wherein the chemical composition further comprises one or more chemical elements selected from the group consisting of, by mass %, Ta: 0.001% or more and 0.010% or less and Sn: 0.002% or more and 0.2% or less.

7. The galvanized steel sheet according to claim 1, wherein the chemical composition further comprises one or more chemical elements selected from the group consisting of, by mass %, Cr: 0.05% or more and 1.0% or less, V: 0.005% or more and 0.5% or less, Mo: 0.005% or more and 0.5% or less, Ni: 0.05% or more and 1.0% or less and Cu: 0.05% or more and 1.0% or less.

8. The galvanized steel sheet according to claim 7, wherein the chemical composition further comprises one or more chemical elements selected from the group consisting of, by mass %, Ti: 0.01% or more and 0.1% or less, Nb: 0.01% or more and 0.1% or less and B: 0.0003% or more and 0.005% or less.

9. The galvanized steel sheet according to claim 7, wherein the chemical composition further comprises one or more chemical elements selected from the group consisting of, by mass %, Ca: 0.001% or more and 0.005% or less and REM: 0.001% or more and 0.005% or less.

10. The galvanized steel sheet according to claim 7, wherein the chemical composition further comprises one or more chemical elements selected from the group consisting of, by mass %, Ta: 0.001% or more and 0.010% or less and Sn: 0.002% or more and 0.2% or less.

11. The galvanized steel sheet according to claim 1, wherein the chemical composition further comprises one or more chemical elements selected from the group consisting of, by mass %, Ti: 0.01% or more and 0.1% or less, Nb: 0,01% or more and 0.1% or less and B: 0.0003% or more and 0.005% or less.

12. The galvanized steel sheet according to claim 11, wherein the chemical composition further comprises one or more chemical elements selected from the group consisting of, by mass %, Ca: 0.001% or more and 0.005% or less and REM: 0.001% or more and 0.005% or less.

13. The galvanized steel sheet according to claim 11, wherein the chemical composition further comprises one or more chemical elements selected from the group consisting of, by mass %, Ta: 0.001% or more and 0.010% or less and Sn: 0.002% or more and 0.2% or less.

14. The galvanized steel sheet according to claim 1, wherein the chemical composition further comprises one or more chemical elements selected from the group consisting of, by mass %, Ca: 0.001% or more and 0.005% or less and REM: 0.001% or more and 0.005% or less.

15. The galvanized steel sheet according to claim 14, wherein the chemical composition further comprises one or more chemical elements selected from the group consisting of, by mass %, Ta: 0.001% or more and 0.010% or less and Sn: 0.002% or more and 0.2% or less.

16. The galvanized steel sheet according to claim 1, wherein the chemical composition further comprises one or more chemical elements selected from the group consisting of, by mass %, Ta: 0.001% or more and 0.010% or less and Sn: 0.002% or more and 0.2% or less.

17. The galvanized steel sheet according to claim 1, wherein the chemical composition further comprises, by mass %, Sb: 0.002% or more and 0.2% or less.

18. A method for manufacturing the galvanized steel Sheet according to claim 1, consisting of:
  hot-rolling a steel slab comprising the chemical composition with a finishing delivery temperature of 850° C. or higher,
  coiling the resulting hot-rolled steel sheet at a temperature of 450° C. or higher and 600° C. or lower,
  pickling the steel sheet,
  annealing the steel sheet by holding the steel sheet at a temperature of 600° C. or higher and 750° C. or lower for a holding time of 50 seconds or more and 550 seconds or less,
  cooling the steel sheet,
  galvanizing the steel sheet, and
  performing alloyina on the steel sheet at a temperature of 470° C. or higher and 600° C. or lower after galvanizing has been performed.

* * * * *

UNITED STATES PATENT AND TRADEMARK OFFICE
CERTIFICATE OF CORRECTION

PATENT NO. : 9,765,413 B2  Page 1 of 1
APPLICATION NO. : 13/809953
DATED : September 19, 2017
INVENTOR(S) : Kawasaki et al.

It is certified that error appears in the above-identified patent and that said Letters Patent is hereby corrected as shown below:

In the Claims

<u>In Column 18</u>
At Line 31, in Claim 8 please change "alloyina" to --alloying--.

Signed and Sealed this
Twenty-seventh Day of February, 2018

Andrei Iancu
*Director of the United States Patent and Trademark Office*